(12) United States Patent
Mackert

(10) Patent No.: US 11,864,662 B2
(45) Date of Patent: Jan. 9, 2024

(54) SEATING FURNITURE CHASSIS

(71) Applicant: Innotec Motion GmbH, Lippstadt (DE)

(72) Inventor: Michael Mackert, Rüthen (DE)

(73) Assignee: Innotec Motion GmbH, Lippstadt (DE)

( * ) Notice: Subject to any disclaimer, the term of this patent is extended or adjusted under 35 U.S.C. 154(b) by 256 days.

(21) Appl. No.: 17/371,893

(22) Filed: Jul. 9, 2021

(65) Prior Publication Data

US 2021/0330087 A1 Oct. 28, 2021

Related U.S. Application Data

(63) Continuation of application No. PCT/EP2020/050510, filed on Jan. 10, 2020.

(30) Foreign Application Priority Data

Jan. 10, 2019 (DE) .......................... 202019100109.7

(51) Int. Cl.
*A47C 4/02* (2006.01)
*A47C 7/54* (2006.01)
*F16B 12/26* (2006.01)

(52) U.S. Cl.
CPC .............. *A47C 7/546* (2013.01); *A47C 4/028* (2013.01); *A47C 7/541* (2018.08); *F16B 12/26* (2013.01)

(58) Field of Classification Search
CPC ........... A47C 7/546; A47C 7/541; A47C 4/02; F16B 12/26; F16B 12/38; F16B 12/60
See application file for complete search history.

(56) References Cited

U.S. PATENT DOCUMENTS 3,989,298 A * 11/1976 Cycowicz ................ A47C 4/02
297/317
4,061,371 A * 12/1977 Prather .................... E05C 3/045
292/203
4,470,716 A * 9/1984 Welch ..................... F16B 12/38
248/221.12

(Continued)

FOREIGN PATENT DOCUMENTS

| DE | 4440553 C1 | 3/1996 |
| DE | 102016100753 A1 | 9/2016 |
| EP | 2796074 A1 | 10/2014 |

OTHER PUBLICATIONS 5 page PDF of the written opinion dated Feb. 10, 2020 if PCT/EP2020/050510. (Year: 2020).*

(Continued)

*Primary Examiner* — Robert Canfield
(74) *Attorney, Agent, or Firm* — Edell, Shapiro & Finnan, LLC

(57) ABSTRACT

A seating furniture chassis comprises a base body, a fastener, and a side part. The fastener is arranged on the base body and comprises a fastening element and a spring element that exerts a spring force on the fastening element. The side part is releasably fastened to the fastener by utilizing the spring force and released by overcoming the spring force. The fastening element is moved counter to the spring force upon fastening of the side part to the fastener. The fastener comprises a first positive-fit element and the side part comprises a second positive-fit element. The first positive-fit element and the second positive-fit element are configured for a positive-fit connection to one another.

19 Claims, 4 Drawing Sheets

(56) References Cited

U.S. PATENT DOCUMENTS

| | | | | |
|---|---|---|---|---|
| 4,752,150 | A * | 6/1988 | Salice | F16B 12/26 403/231 |
| 4,826,345 | A * | 5/1989 | Salice | F16B 12/2063 403/231 |
| 4,890,888 | A * | 1/1990 | Kostin | B60N 2/68 297/440.21 |
| 5,005,908 | A * | 4/1991 | Young | A47C 7/40 24/653 |
| 5,184,871 | A * | 2/1993 | LaPointe | A47C 7/42 403/374.5 |
| 5,931,514 | A * | 8/1999 | Chung | F16B 12/26 292/87 |
| 6,752,464 | B1 * | 6/2004 | Tseng | A47C 7/42 297/440.16 |
| 10,188,209 | B2 * | 1/2019 | Hoffmann | A47B 88/956 |
| 11,406,192 | B1 * | 8/2022 | Wu | A47C 4/02 |
| 11,517,115 | B2 * | 12/2022 | McCreary | B60N 3/16 |
| 2006/0033368 | A1 * | 2/2006 | Longnecker | A47C 13/005 297/248 |
| 2009/0113673 | A1 * | 5/2009 | Weber | F16B 12/26 24/1 |
| 2010/0254757 | A1 * | 10/2010 | Saul | F16B 12/20 403/404 |
| 2012/0279161 | A1 * | 11/2012 | Hakansson | F16B 5/0614 52/588.1 |
| 2012/0280550 | A1 * | 11/2012 | College | F16B 12/26 403/345 |
| 2014/0077677 | A1 * | 3/2014 | Holzapfel | A47B 88/95 312/348.4 |
| 2016/0088943 | A1 * | 3/2016 | Connor | A47C 4/028 297/440.15 |
| 2017/0074307 | A1 * | 3/2017 | Slagle | F16B 12/26 |
| 2018/0045234 | A1 * | 2/2018 | Stauss | A47C 17/86 |
| 2018/0328396 | A1 * | 11/2018 | Fransson | F16B 12/24 |
| 2021/0330086 | A1 * | 10/2021 | Mackert | A47C 7/42 |
| 2022/0304472 | A1 * | 9/2022 | Grathwol | F16B 12/60 |
| 2023/0105946 | A1 * | 4/2023 | Zacharenko | A47B 47/0075 312/265.5 |

OTHER PUBLICATIONS

Search Report in corresponding International Patent Application No. PCT/EP2020/050510, dated Feb. 3, 2020.

* cited by examiner

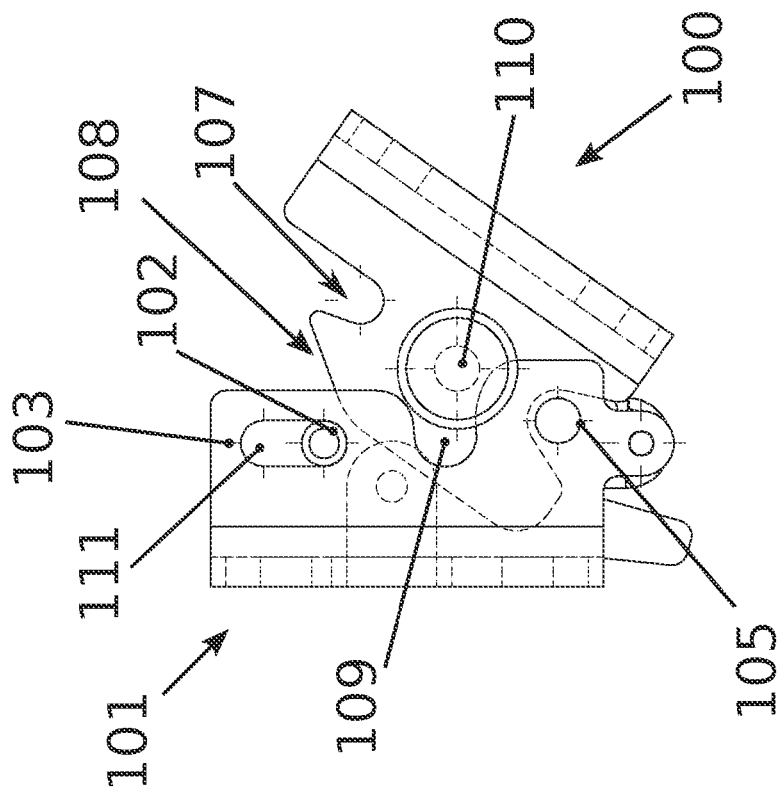
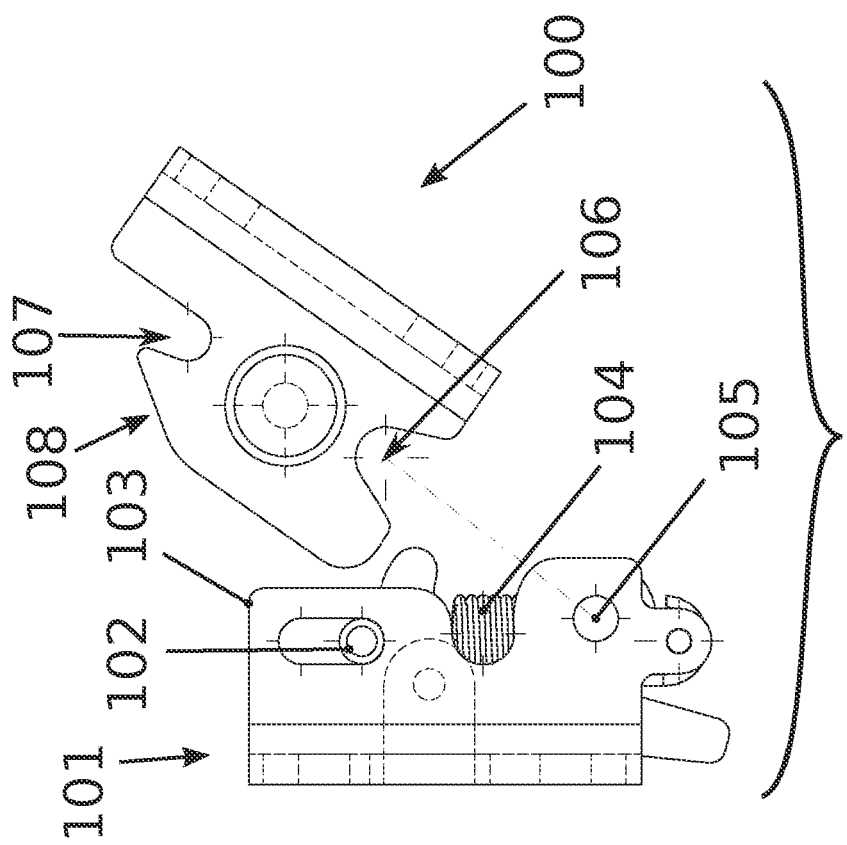
Fig. 1B
Fig. 1A

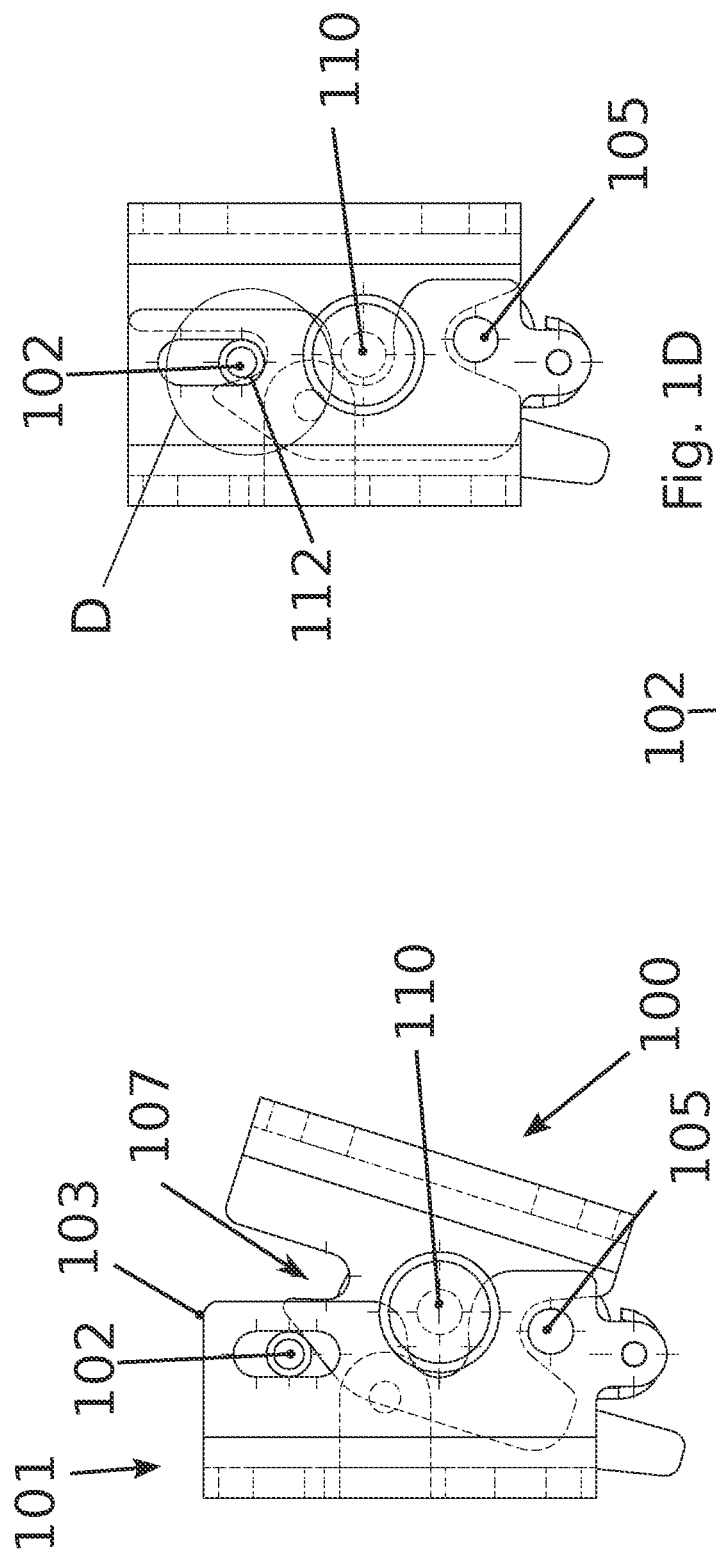

SEATING FURNITURE CHASSIS

This application is a continuation of International Application No. PCT/EP2020/050510, filed on Jan. 10, 2020, which claims priority under 35 U.S.C. § 119 to Application No. DE 202019100109.7 filed on Jan. 10, 2019, the entire contents of which are hereby incorporated by reference.

TECHNICAL FIELD

The present disclosure relates to a seating furniture chassis.

BACKGROUND

Seating furniture chassis are known from the prior art. They are used for seating furniture in that upholsteries are attached to the seating furniture chassis. The seating furniture chassis often enable mechanical functions of the seating furniture. Seating furniture chassis having a base body and side parts releasably fastened thereto are also known from the prior art.

By contrast, the underlying problem addressed by the disclosure is to create a seating furniture chassis having a side part that is simply fastenable to the base body.

SUMMARY

The seating furniture chassis comprises a base body, a fastener, and a side part. In the context of this specification, a base body is understood to mean, in particular, a construct that comprises a seat frame and one or more feet with which the seating furniture chassis is erectable on a floor surface. It is also possible for the base body to comprise a backrest, which is fastened to the seat frame. The seat frame can frame a seat. A user can sit on the upholstery after upholstering the seat surface.

The fastener is arranged on the base body. For example, it can be arranged in a lateral edge area of the base body.

The side part is releasably fastenable to the fastener. In the context of this specification, a releasable fastening is understood to mean, in particular, that the side part can be fastened to the fastener in a tool-free manner and can also be released from the fastener in a tool-free manner. It must be ensured that neither the side part nor the fastener is damaged during the fastening or the release of the fastening.

In the context of this specification, a side part is understood to mean, in particular, a part that is attached to the base body laterally. This is understood to mean, in particular, the sides that extend approximately perpendicular to the front and rear of the base body. The front can be the side to which the legs of a user protrude beyond the base body when the seating furniture chassis is used as intended. The rear can be the side at which there is a backrest in the seating furniture chassis.

The fastener comprises a spring element and a fastening element. The spring element exerts a force on the fastening element. Upon fastening of the side part to the fastener, the fastening element is moved counter to the spring force. In the context of this specification, fastening is understood to mean, in particular, the process of fastening the side part to the base body. In this manner, the side part can be fastened to the fastener by utilizing the spring force and can be released again by overcoming the spring force.

The removable side part has the particular advantage that the base body can be transported separately from the side part. Therefore, two individual, detached, and less cumbersome objects can be transported instead of a single, large, and cumbersome object. It is also advantageous for the user to be able to fasten the side part to the fastener at home, because they can thus select a side part that is suitable for them and is not restricted to a specific side part that is already fastened to the base body. An exchange of the side part is also simplified.

In addition, the handling of the seating furniture chassis during production is simplified. Due to health and safety regulations, it may not be permissible in light of the weight for a single worker to carry both the base body and the side part at the same time. Because the side part and the base body can each be carried individually, a single worker can thus transport the entire seating furniture chassis in a tool-free manner.

According to a disclosed embodiment, the side part can comprise a receiving area. In the fastened state of the side part on the fastener, the fastening element can be arranged in the receiving area and can be held in the receiving area by the spring force.

According to a disclosed embodiment, the receiving area can be configured to exert a clamping force on the fastening element in the fastened state of the side part on the fastener. In this manner, a particularly good fastening is achieved, and it is ensured that there is no play between the fastening element and the receiving area.

According to a disclosed embodiment, the side part can comprise an armrest. In the context of this specification, an armrest is understood to mean, in particular, a component configured to be upholstered and, in the upholstered state, to serve as an arm support for a user sitting on the seating furniture chassis.

According to a disclosed embodiment, the side part can be configured to be fastened to the fastener with a pivoting movement. This is a particularly simple type of fastening that can also be carried out by a user intuitively, in a tool-free manner, and with little effort.

According to a disclosed embodiment, the side part can have a glide surface. The fastening element can be configured to glide along the glide surface upon fastening of the side part to the fastener.

According to a disclosed embodiment, the glide surface can be configured to trigger the movement of the fastener counter to the spring force upon fastening of the side part to the fastener. For example, this movement can occur automatically during the pivoting movement. The fastening of the side part to the fastener is thus particularly simple.

According to a disclosed embodiment, the fastener can have a support element. The side part can comprise a support area. The support area can be configured to rest on the support element upon fastening of the side part to the fastener. This can mean, in particular, that the support area rests on the support element during the pivoting movement of the side part. In this manner, it is particularly simple for the user to carry out the pivoting movement correctly. In so doing, the support element and the support area serve as a positioning aid.

According to a disclosed embodiment, the support area can have a shape that is adapted to an outer shape of the support element. The support area can have, for example, a rounding, the radius of which corresponds approximately to a radius of a rounding of the support element. The performance of the pivoting movement is thus simplified again.

According to a disclosed embodiment, the support element can define a pivot axis of the pivoting movement. In the context of this specification, a pivot axis is understood to mean, in particular, a geometric axis that does not necessarily have to be present as a component.

According to a disclosed embodiment, the support element can be rod-shaped. In the context of this specification, the term "rod-shaped" is understood to mean, in particular, an elongated design in which the length of the support element exceeds its width and height many times over. For example, the length can be more than 10 times the width and height.

According to a disclosed embodiment, the support element can have a round cross-sectional shape. The round cross-sectional shape is particularly advantageous in order to be able to carry out the pivoting movement of the side part well.

According to a disclosed embodiment, the fastening element can be rod-shaped in design.

According to a disclosed embodiment, the fastening element can have a round cross-sectional shape.

According to a disclosed embodiment, the fastener can comprise a guiding mechanism. The guiding element can be configured to guide the fastening element counter to the spring force during the movement.

According to a disclosed embodiment, the guiding element can be configured to hold the fastening element in a first position counter to the spring force. The fastening element can be configured to be moved from the first position into a second position during the movement counter to the spring force.

For example, the guiding element can have an elongated hole, in which the fastening element is guided.

According to a disclosed embodiment, the fastener can comprise a first positive-fit element, wherein the side part comprises a second positive-fit element. The first positive-fit element and the second positive-fit element can be designed for a positive-fit connection with one another. The positive connection can limit or prevent a vertical movement of the side part relative to the fastener. The side part can thus be securely fastened to the fastener.

According to a disclosed embodiment, the side part can be fastenable to the fastener in a tool-free manner and can be releasable from the fastener in a tool-free manner.

In the method, a side part of a seating furniture chassis is fastened to the fastener of this seating furniture chassis according to a disclosed embodiment. First, the support area of the side part is placed on the support element of the fastener. The pivoting movement is then carried out about the pivot axis defined by the support element. During the pivoting movement, the fastening element is moved counter to the spring force.

The fastening element is then inserted into the receiving area by way of the spring force and clamped in the receiving area.

BRIEF DESCRIPTION OF THE DRAWINGS

Further features and advantages of the disclosed furniture seat chassis will become apparent from the following description of preferred exemplary embodiments with reference to the attached drawings. The same reference numerals are used for the same or similar components as well as for components having the same or similar functions. The figures show:

FIGS. 1A-1E are schematic lateral views of the process of fastening of a side part to a fastener in a seating furniture chassis according to a disclosed embodiment;

DETAILED DESCRIPTION

Figure 2:
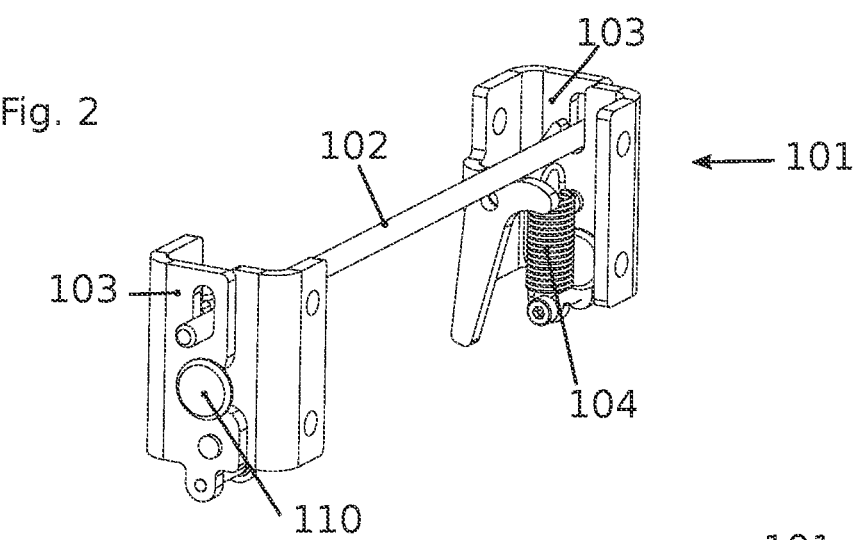
FIG. 2 is a schematic perspective view of a fastener of a seating furniture chassis according to a disclosed embodiment.
Figure 3:
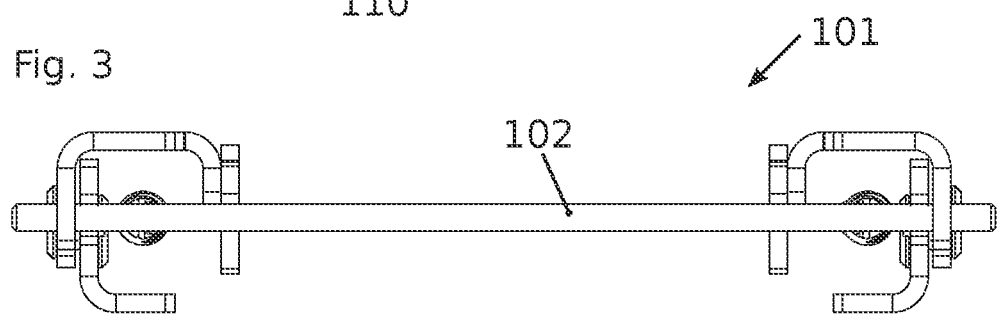
FIG. 3 is a schematic plan view of the fastener from FIG. 2.

FIGS. 1A to 1D show only a section of the side part 100. This is the section with which the side part 100 is fastened to the fastener 101. FIG. 1E shows an enlargement of the section labeled D in FIG. 1D.

The fastener 101 comprises a fastening element 102, a guiding element 103, a spring element 104, and a support element 105. The side part 100 has a support area 106, a receiving area 107, a glide surface 108, and a clamping mechanism 112. The spring element 104 exerts a spring force on the fastening element 102, such that the fastening element 102 is held in the first position shown in FIG. 1A.

In order to fasten the side part 100 to the fastener 101, the support area 106 is initially placed on the support element 105. In order to facilitate assembly for a user, the support element 105 and the support area 106 can be designed in the same color. It can thus be made clear to the user in a simple manner that these two components must be connected to one another. Additionally or alternatively, the support element 105 and the support area 106 can each have a shape marking. This makes assembly easier, in particular for blind people. The shape markings can be identical to one another or correspond to one another, such that it can be felt that the two components belong to one another. In FIG. 1B, the support element 105 of fastener 101 and the support area 106 of side part 100 are shown in the connected state. The side part 100 is then pivoted about a pivot axis, which is defined by the support element 105. During this pivoting movement, the glide surface 108 comes into contact with the fastening element 102 and moves it counter to the spring force. During this movement, the fastening element is guided in an elongated hole 111 in the guiding element 103. This state is shown in FIG. 1C.

During the pivoting movement, a projection 110 of the side part 100, for example a bolt or a rivet, engages with a recess 109 on the fastener 101 (FIGS. 1B and 1D). The recess 109, which comprises a first positive-fit element, and the projection 110, which comprises a second positive-fit element, form a positive-fit connection in a vertical direction. A vertical movement of the side part 100 relative to the fastener 101 is thus limited or prevented.

FIG. 1D shows how the side part 100 is fastened to the fastener 101. The fastening element 102 is again in the first position and is held there by the spring force. In addition, the clamping mechanism 112 exerts a clamping force on the fastening element 102 in this position, as shown in FIG. 1E, such that a particularly good fastening is achieved, and mechanical play of the fastening element 102 in the first position is reduced.

Figure 4:
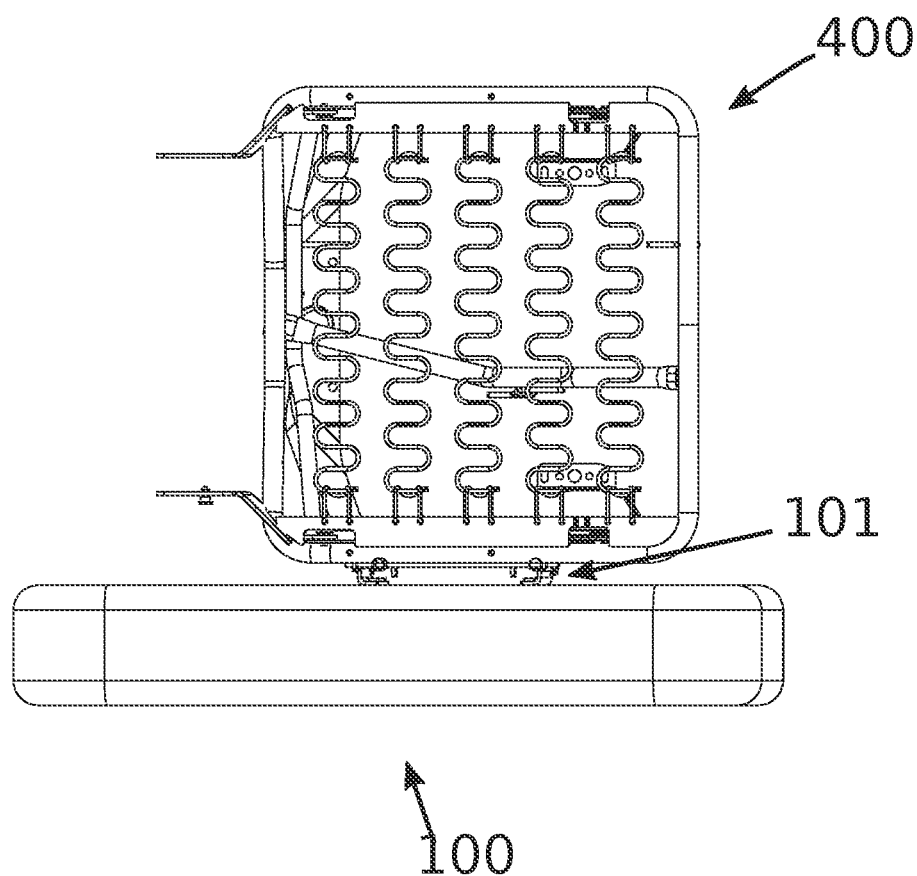
FIG. 4 is a schematic plan view of a seating furniture chassis according to a disclosed embodiment.
Figure 5:
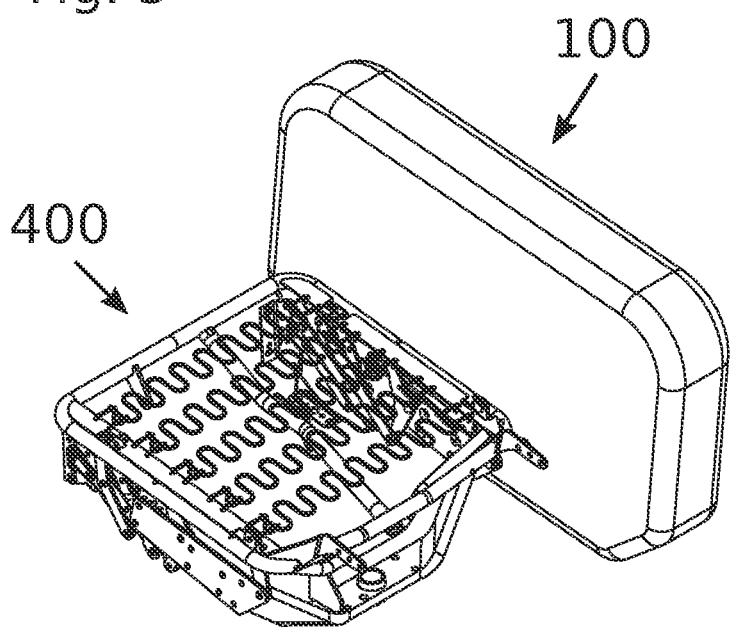
FIG. 5 is a schematic perspective view of the seating furniture chassis from FIG. 4.

FIGS. 4 and 5 show that the seating furniture chassis has a seat frame 400 on which the fastener 101 is arranged. The side part 100 is thus fastened to the seat frame laterally.

What is claimed is:

1. A seating furniture chassis comprising:
    a base body;
    a fastener arranged on the base body; and
    a side part releasably fastenable to the fastener,
    wherein the fastener comprises a fastening element, a spring element that exerts a spring force on the fastening element, a first positive-fit element, and a support element,
    wherein the side part comprises a second positive-fit element and a support area configured to rest on the support element upon fastening of the side part to the fastener,
    wherein the side part is configured to be fastened to the fastener with a pivoting movement,
    wherein the fastening element is moved counter to the spring force upon fastening of the side part to the fastener,
    wherein the first positive-fit element and the second positive-fit element are configured for a positive-fit connection to one another, and
    wherein the positive-fit connection limits or prevents a vertical movement of the side part relative to the fastener.

2. The seating furniture chassis of claim 1, wherein the side part comprises a receiving area and the fastening element is arranged in the receiving area in a fastened state of the side part on the fastener and is held in the receiving area by the spring force.

3. The seating furniture chassis of claim 2, wherein the receiving area is configured to exert a clamping force on the fastening element in the fastened state of the side part on the fastener.

4. The seating furniture chassis of claim 1, wherein the side part comprises an armrest.

5. The seating furniture chassis of claim 1, wherein the side part has a glide surface and the fastening element is configured to glide along the glide surface to fasten the side part to the fastener.

6. The seating furniture chassis of claim 5, wherein the glide surface is configured to trigger the movement of the fastening element counter to the spring force upon fastening of the side part to the fastener.

7. The seating furniture chassis of claim 1, wherein the support area has a shape that is adapted to an outer shape of the support element.

8. The seating furniture chassis of claim 1, wherein the support element defines a pivot axis of the pivoting movement.

9. The seating furniture chassis of claim 1, wherein the support element is rod-shaped.

10. The seating furniture chassis of claim 1, wherein the support element has a round cross-sectional shape.

11. The seating furniture chassis of claim 1, wherein the fastening element is rod-shaped.

12. The seating furniture chassis of claim 1, wherein the fastening element has a round cross-sectional shape.

13. The seating furniture chassis of claim 1, wherein the fastener comprises a guiding element configured to guide the fastening element during the movement counter to the spring force.

14. The seating furniture chassis of claim 13, wherein the guiding element is configured to hold the fastening element in a first position counter to the spring force, and the fastening element is configured to be moved from the first position into a second position during the movement counter to the spring force.

15. The seating furniture chassis of claim 1, wherein the side part is fastenable to the fastener in a tool-free manner and releasable from the fastener in a tool-free manner.

16. A method for fastening the side part of the seating furniture chassis of claim 1 to the fastener of the seating furniture chassis, the method comprising:
    placing the support area of the side part on the support element of the fastener;
    performing a pivoting movement about a pivoting axis defined by the support element, wherein the fastening element is moved counter to the spring force during the pivoting movement;
    inserting the fastening element into a receiving area via the spring force; and
    clamping the fastening element in the receiving area.

17. The seating furniture chassis of claim 1, wherein the first positive-fit element is a recess of the fastener and the second positive-fit element is a projection of the side part.

18. The seating furniture chassis of claim 17, wherein the projection is a bolt or a rivet.

19. The seating furniture chassis of claim 13, wherein the guiding element includes an elongated hole in which the fastening element is guided during the movement counter to the spring force.

* * * * *